United States Patent Office 3,428,655
Patented Feb. 18, 1969

3,428,655
CONTROLLING INSECTS AND OTHER PESTS WITH PHOSPHONOTHIOATES
Thomas Mason Melton, Richmond, Va., and Harold A. Kaufman, New Brunswick, N.J., assignors to Mobil Oil Corporation, a corporation of New York
No Drawing. Filed Sept. 20, 1965, Ser. No. 488,769
U.S. Cl. 260—330.5     3 Claims
Int. Cl. C07d 63/10; A01n 9/36

ABSTRACT OF THE DISCLOSURE

Organophosphorus compounds containing sulfur are provided which are useful as pesticidal agents. The new compounds are derivatives of phosphonothioate acids containing the benzothienyl group, and are characterized as S-alkyl O- or S-benzothienyl alkylphosphonothioates.

---

The present invention relates to organic compounds of phosphorus having therein one or more sulfur atoms. More particularly, this invention relates to phosphonothioic acid ester derivatives containing the benzo [b] thienyl group and substituted members thereof.

One object of the invention is to provide new and useful compounds within the named class. It is another object to provide new pesticidal compositions, and methods for destroying pests which comprises applying thereto a pesticidal amount of the inventive chemicals per se or pesticidally effective amounts of combinations of them with carrier adjuvants. Other objects will be apparent from the remaining disclosure and the appended claims.

In accordance with this invention, new compounds are provided within the class described, said compounds being represented by the formula

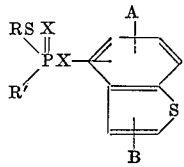

wherein R and R' are alkyls of from 1 to 4 carbon atoms, A and B are selected from the group consisting of hydrogen; alkyl having from 1 to 12 carbon atoms; alkoxy having from 1 to 12 carbon atoms; halogen e.g., chlorine, bromine, fluorine; nitro; alkylmercapto, the alkyl portion containing up to 12 carbon atoms; cyano; thiocyano; sulfonic acid; sulfonamide; and —C(O)M, wherein M is selected from the group consisting of —OH, —OCH$_3$, —OC$_2$H$_5$, lower alkyl, —NRR', and —NHNRR', where R and R' are H or lower alkyls; and combinations thereof, and X is a member of the group consisting of oxygen and sulfur.

Generally, the inventive compounds may be prepared from an S-alkyl alkylphosphonohalidothioate of the formula

wherein R, R' and X are as above-defined, and M is halogen, with a compound of the formula

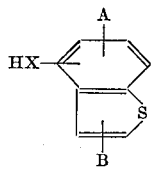

wherein A, B, and X have the same meanings as above. Specifically, they are prepared according to the examples set forth hereinafter.

The instant organic phosphorus compounds are well-defined, stable liquids (or solids) which are particularly suited for use as pesticides when employed along or in combination with carriers generally used in the pesticide art. The carriers may be liquid or solid, the choice being governed in large measure by the size of the area to be treated and the kind of equipment available for application. When liquid formulations are used, they may be in the form of true solutions or in the form of dispersions or emulsions.

"Solutions," as used herein, means that the compounds of the invention are of molecular size held in true solution by any suitable solvent therefor. The chemicals of the invention are generally water insoluble, thus requiring an organic liquid as the solvent if true solutions are desired. Where such a solution is employed, the phytotoxicity of the organic solvent as well as its ability to solubilize the chemical must be considered. In many applications against pests, solvent phytotoxicity is immaterial. With the advent of extensive use against agricultural pests, however, and the consequent demand for toxicants which can be sprayed or dusted directly onto the growing plant without ill effects upon the plant itself, this factor is now an important consideration. Thus, the organic solvent must be one which has no phytotoxic effects, or if it does, it must evaporate quickly enough for such effects to be negligible. Acetone, for example, will cause plant injury under certain conditions, but when sprayed in the open it dissipates quickly, leaving the plant free from injury.

The term "dispersion" is meant to cover those liquid phases in which the active ingredient may be colloidal in size and which is distributed throughout such phase as particles held in suspension by wetting agents or by soaps. The dispersive medium is usually aqueous in toto, but it may contain small amounts of organic solvents, that is, amounts not sufficient to cause solution of the active member.

The wetting agents mentioned, in addition to aiding in suspending the toxic particles, are useful as aids in uniformly distributing the active material over the area to be treated, particularly when treating plants. In other words, the wetting agent helps to prevent a build-up of droplets on certain portions of the area, leaving other portions untouched or insufficiently treated by the toxicant. A useful wetting agent is Tween-20, which is a polyoxyethylene sorbitan monolaurate. Others are so well-known to the art that it would serve no purpose to enumerate them further.

The solid formulations contemplated may be dust or granules containing a pesticidal amount of the inventive compounds. Many solids are known by the art to be useful as pesticidal carriers, examples of which are: kaolin; talc; kieselghur; diatomaceous earth; pyrophyllite; bentonite; calcium carbonate; powdered cork, wood, walnut shells, and peanut shells; fuller's earth; and tricalcium phosphate.

Solid formulations may be prepared merely by grinding carrier and chemical together, and tumbling for a sufficient time to obtain adequate distribution of the chemical. This method, however, is time-consuming and is likely to give a non-uniform product. It has been found that a more uniform product can be made if the active ingredient is dissolved in a volatile solvent such as acetone prior to admixing with the carrier. This solution is then added to a tumbling mass of carrier, tumbled for a further time until well-mixed, and then dried in any convenient manner. The mass may, for example, be dried by applying heat to the tumbling mass or by spreading the mass into a thin layer and allowing it to dry in the open.

Additionally, the organic phosphorus compounds of the present invention may be applied as aerosols, in which case it is convenient to dissolve them in any suitable solvent and to disperse this solution in dichlorodifluoromethane or other chlorofluoroalkane having a boiling point below room temperature at ambient pressures. It is contemplated that other suitable materials boiling below room temperature will be useful for this purpose.

The concentration of the chemicals disclosed herein may vary over a considerable range provided a lethal or toxic dosage thereof is placed upon the insect or in its immediate surroundings. Practically, the formulations will, in their most useful concentrations, contain from about 0.0001 to about 1% of active ingredient by weight. A somewhat higher concentration than 1% may at times be necessary because of weather conditions, pest resistance, and the like, but usually formulations containing 1% or less will be adequate.

As mentioned, pests can be controlled with the compounds of this invention by applying them, or compositions of them containing pesticidally active amounts, to the insect itself or in or around its habitat. If soil-borne pests are the subjects of control, the toxicant or compositions containing it may be sprayed (if a liquid) or spread (if a solid) over the ground. Thereafter, the material may be left to the natural action of rainfall, or it may be drenched or plowed and disked into the soil. If the host is a plant, a solid formulation may be dusted onto the plant in the same manner used to apply other well-known solid pesticides. When liquid sprays are used to treat infested plants, the liquid composition may be sprayed onto the plant just to the point of liquid run-off.

Having described the invention in general terms, the following examples of the inventive chemicals and their use as pesticides are offered. It will be understood that the examples given are offered merely to illustrate the invention. The specific illustrations are thus in no way to be construed as limitations upon the scope thereof. The chemicals contemplated as inventive, both with respect to the chemicals themselves and their use against pests, are to be limited only to the extent of the broader definition set forth in the foregoing disclosure, the appended claims, and equivalents reasonably flowing therefrom.

In the following examples, "parts" are parts by weight.

EXAMPLE 1

S-4(benzo [b] thienyl) S-n-propyl methylphosphonotrithioate

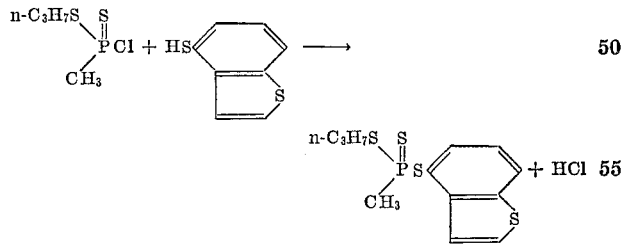

Into a suitable flask equipped with a stirrer, reflux condenser, thermometer, and additional funnel there were placed 10.1 parts of triethylamine and 88 parts of benzene. 16.8 parts of 4-mercaptobenzothiophene was added thereto, with stirring and cooling, at 25–30° C. To this mixture, there was added, while stirring, 18.9 parts of S-n-propyl methylphosphonochloridodithioate in 1 minute. The mixture was heated at 60–70° C. for 1¾ hours, with stirring. It was then cooled, filtered to remove the triethylamine hydrochloride, stripped to 65° C. at 30 mm. of Hg to remove the benzene, and finally distilled.

There was obtained 18.4 parts (58% of theory) of the product boiling at 168–78° C. at 22–38 mm. of Hg. This product had the following properties: Refractive index, $n_D^{22}=1.6915$; density, $d_4^{20}=1.294$; P (calculated), 9.73%; P (found), 9.75%; S (calculated), 40.30%; S (found), 40.44%.

EXAMPLE 2

O-4(benzo [b] thienyl S-propyl methylphosphonodithioate

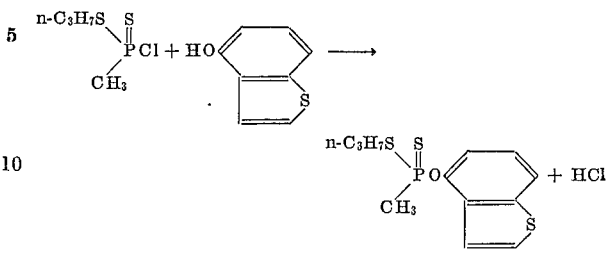

In a process similar to that given in Example 1, using 0.1 mole of 4-hydroxybenzothiophene instead of the 4-mercaptobenzothiophene, there was obtained 19.3 parts (64% of theory) of product boiling at 153–8° C. at 0.23 mm. of Hg. This product had the following properties: Refractive index, $n_D^{28}=1.6303$; density, $d_4^{20}=1.280$; P (calculated), 10.25%; P (found), 10.54%; S (calculated), 32.22%; S (found), 31.70%.

EXAMPLE 3

O-5-(benzo [b] thienyl) S-n-propyl methylphosphonodithioate

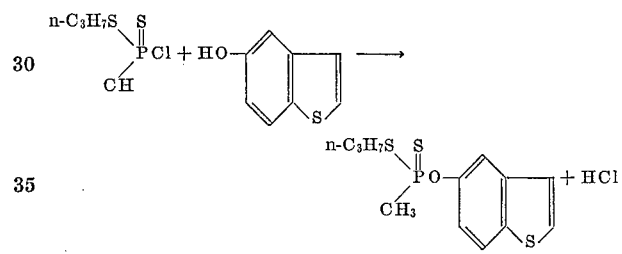

This compound can be prepared using a process similar to that given in Example 2, using 0.1 mole of 5-hydroxybenzothiophene.

EXAMPLE 4

O-(7-methyl-4-benzo [b] thienyl) S-n-propyl methylphosphonodithioate

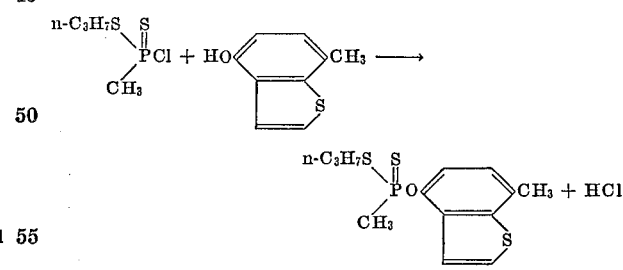

This compound may be prepared using a process similar to that given in Example 2, employing 0.1 mole of 4-hydroxy-7-methylbenzothiophene.

EXAMPLE 5

O-(2,3-dihydro-4-benzo [b] thienyl) S-n-propyl methylphosphonodithioate

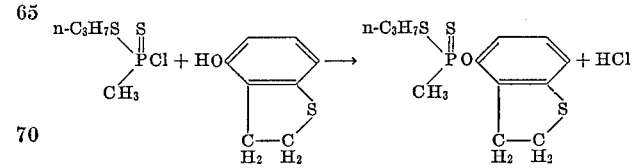

Using 0.1 mole of 4-hydroxy-2,3-dihydrobenzothiophene, the designated compound may be prepared in a process similar to that of Example 2.

EXAMPLE 6

O-(7-[methylmercapto]-4-benzo [b] thienyl) S-n-propyl-methylphosphonodithioate

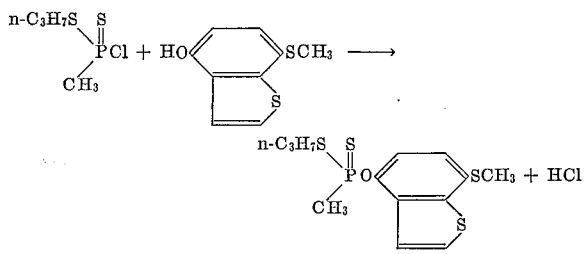

This compound may be prepared by employing a process similar to that given for Example 2, using 0.1 mole of 4-hydroxy-7-(methylmercapto) benzothiophene.

EXAMPLE 7

O-(7-nitro-4-benzo [b] thienyl) S-n-propyl methylphosphonodithioate

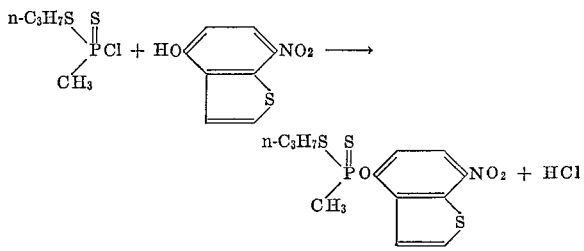

This compound may be prepared in the process of Example 2, using 0.1 mole of 4-hydroxy-7-nitrobenzothiophene.

The following will illustrate the use of the inventive chemicals as pesticides.

Control of mites

The compounds of Examples 1 and 2 above were formulated as wettable powder concentrates by adding known weights thereof to an insert carrier comprising essentially 25 parts of Micro-Cel 800 (an anionic alkyl aryl sulfonate), 2 parts of Nacconol SW (a synthetic calcium silicate), and 73 parts of Pyrax. This mixture of active compound and inert carrier was ground to a uniform blend and was then diluted in water to desired concentrations of chemical. Reference, or "check," formulations were formulated in the same manner, but without the active component.

Cranberry bean plants infested with various life stages of two-spotted spider mites were dipped in the test concentration of the respective formulations and were allowed to dry. The plants thus treated were maintained under greenhouse conditions for 72 hours and were then observed for percentage mortality of the subject mites. Three replicates were used at each concentration.

In the way described the two-spotted spider mite was checked against concentrations of chemicals ranging progressively from 1000 p.p.m. to 2.5 p.p.m. In the case of the chemical of Example 1, there was a 100% mortality of mites at each concentration tried from 1000 p.p.m. down to 125 p.p.m. The chemical of Example 2, on the other hand, was 100% effective down to the 5 p.p.m. level, and was 96% effective at the 2.5 p.p.m. level.

Control of the confused flour beetle and other insects

Three grams of whole wheat flour was placed in a 20 x 90 mm. petri dish. One ml. of acetone containing 8, 4, or 2 mg. of the test compound was poured over the flour and mixed therewith. After a two-hour period the flour was pushed to one side of the dish, and confused flour bettles, *Tribolium confusum*, were placed in the dish. The dish was thereafter covered with a cheese cloth top. Compounds at each concentration were run in triplicate, and the results below, taken after 48 hours, are averages of the replicates.

| Compound | Rate, mg. | percent Kill |
|---|---|---|
| Example 1 | 8 | 97 |
|  | 4 | 77 |
| Example 2 | 8 | 100 |
|  | 4 | 80 |
|  | 2 | 72 |

Various concentrations of the two chemicals were used to test effectiveness against other pests, and the results are as follows:

| Compound | Concentration p.p.m. | Pest/percent Kill | | |
|---|---|---|---|---|
| | | Mexican Bean Beetle | Southern Armyworm | Pea Aphids |
| Example 1 | 1,000 | 100 | 100 | 100 |
|  | 500 | 67 |  | 63 |
|  | 250 | 53 |  |  |
| Example 2 | 1,000 | 100 | 87 | 100 |
|  | 500 | 100 |  | 83 |
|  | 250 | 93 |  | 50 |
|  | 125 | 87 |  |  |

Nematode control

Soil containing eggs and knots of the root-knot organism, *Meloidogyne incognita*, was mixed with the compound of Example 2 in the proportions to give a concentration of 100 p.p.m. by weight of the chemical. Single-eye seed pieces of pre-sprouted, 8 to 10 day-old Kennebec potato plants, grown in sand, were then transplanted to the treated soil. When significant evidence of nematode development was detectable in untreated controls, as evidenced by surface knots and/or knots on the root systems themselves, treated plants were then observed for comparative root-knot development.

Percentage root-knot control, as determined by a computation based upon the ratio of knots present on the untreated control, was 99.6%.

We claim:
1. A compound of the formula

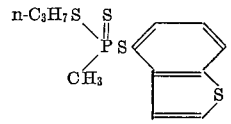

2. A compound of the formula

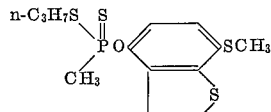

3. A compound of the formula

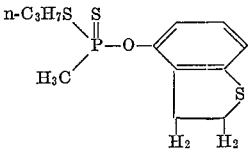

References Cited

UNITED STATES PATENTS 3,004,980 10/1961 Schrader _____ 260—306
3,151,146 9/1964 Schrader et al. _____ 260—461
3,209,020 9/1965 Schrader _____ 260—461

OTHER REFERENCES

Frear, et al., J. of Economic Entomology, vol. 40, No. 5, 736–41 (1947).

HENRY R. JILES, *Primary Examiner.*

C. M. SHURKO, *Assistant Examiner.*

U.S. Cl. X.R.

167—33; 424—275